(12) United States Patent
Son

(10) Patent No.: US 8,500,327 B2
(45) Date of Patent: Aug. 6, 2013

(54) SAFETY THERMOMETER

(76) Inventor: Yun-Ho Son, Seoul (KR)

( * ) Notice: Subject to any disclaimer, the term of this patent is extended or adjusted under 35 U.S.C. 154(b) by 333 days.

(21) Appl. No.: 12/892,127

(22) Filed: Sep. 28, 2010

(65) Prior Publication Data

US 2011/0075701 A1    Mar. 31, 2011

(30) Foreign Application Priority Data

Sep. 29, 2009  (KR) .................. 10-2009-0092501

(51) Int. Cl.
  *G01K 7/00*  (2006.01)
(52) U.S. Cl.
  USPC .......................................... 374/163; 374/208
(58) Field of Classification Search
  USPC .................. 374/163, 208, 155, 100
  See application file for complete search history.

(56) References Cited

U.S. PATENT DOCUMENTS

| | | | | |
|---|---|---|---|---|
| 3,139,753 A | * | 7/1964 | Brudner | 374/183 |
| 4,601,589 A | * | 7/1986 | Meisner | 374/208 |
| 2010/0002746 A1 | * | 1/2010 | Stern | 374/155 |

FOREIGN PATENT DOCUMENTS

JP    62021026 A  *  1/1987

OTHER PUBLICATIONS

Translation of JP 62021026A.*

* cited by examiner

*Primary Examiner* — Mirellys Jagan
(74) *Attorney, Agent, or Firm* — Design IP

(57) ABSTRACT

A safety thermometer in which power is automatically turned on when a sensor rod for measuring a temperature is taken out. The sensor rod is easily taken in the housing when a force is applied to the sensor rod. A sensor rod slider opposes a tip of the sensor rod and has a sensor contact point for connecting a sensor signal of the sensor rod to a circuit. The housing has a space for receiving the sensor rod, a partition wall and a second space to receive circuit devices. A temperature measurement unit is turned on by receiving a power from a power source unit when it contacts the sensor contact point of the sensor rod slider, the temperature measurement unit being connected to the temperature sensor of the sensor rod through the sensor rod slider to process and output a value detected by the temperature sensor.

6 Claims, 3 Drawing Sheets

SAFETY THERMOMETER

BACKGROUND OF THE INVENTION

1. Field of the Invention

The present invention relates to a safety thermometer, and more particularly, to a safety thermometer in which a power is automatically turned on when a sensor rod for measuring a temperature is taken out of the housing and the sensor rod is easily taken in the housing when a force is applied to the sensor rod to protect persons.

2. Description of the Related Art

Generally, an electronic thermometer or salt meter includes a pin-type sensor rod protruding longitudinally from a main body to measure a temperature of an object to be measured (hereinafter, referred to as a "measurement object"). The pin-type sensor rod may somewhat maintain a distance between the measurement object and a user. However, since the pin-type sensor rod includes a tip having a long and sharp shape, persons may be pricked by the tip of the pin-type sensor rod when the sensor rod contacts a human body during the movement or measurement. For example, since a sensor rod formed of a stainless steel has a thin shape such as a needle, the sensor rod may become a deadly weapon. Thus, it is difficult to use the electronic thermometer or salt meter in a kitchen of a home at which child or other persons are easily approachable.

Also, since a related are electronic thermometer has a long and sharp shape, measurement errors may occur due to a too long distance between a temperature sensor disposed on a tip thereof and a main body. That is, since a sensor rod and a lead wire have superior conductivity, heat detected at a beginning moment may be dispersed and radiated to cause an error between the detected temperature and an actual temperature.

Thus, due to such a structural limitation of the electronic thermometer, it takes a long time for measuring a temperature because the measurement object and the sensor rod should contact each other for a time greater than a predetermined time to reach thermal equilibrium therebetween so as to accurately measure the temperature of the measurement object.

SUMMARY OF THE INVENTION

Accordingly, the present invention is directed to a safety thermometer that substantially obviates one or more problems due to limitations and disadvantages of the related art.

An object of the present invention is to provide a safety thermometer in which a power is automatically turned on when a sensor rod for measuring a temperature is taken out of the housing and the sensor rod is easily taken in the housing when an external force is applied to the sensor rod to protect persons.

Another object of the present invention is to provide a safety thermometer in which a sensing portion for detecting a temperature is insulated from other portions to prevent heat from being dispersed, thereby quickly and accurately measuring the temperature.

According to an aspect of the present invention, there is provided a safety thermometer including: a pin-type sensor rod on which a temperature sensor for measuring a temperature is disposed on a tip thereof; a sensor rod slider integrally coupled to a side opposite to the tip of the sensor rod to slide the sensor rod between a measurement position and a safety position, the sensor rod slider having a sensor contact point for connecting a sensor signal of the sensor rod to a circuit; a housing in which a space for receiving the sensor rod and a slide groove are defined to take the sensor in or out by the sensor rod slider, the housing having a space separated from the space for receiving the sensor rod by a partition wall to receive circuit devices; a temperature measurement unit turned on by receiving a power from a power source unit when it contacts the sensor contact point of the sensor rod slider, the temperature measurement unit being connected to the temperature sensor of the sensor rod through the sensor rod slider to process and output a value detected by the temperature sensor; and a display unit displaying the value measured by the temperature measurement unit, wherein, when the sensor rod for measuring the temperature is taken out the housing, the power is automatically turned on, and when the sensor rod contacts a human body, the sensor rod is easily taken in the housing to protect the human body.

A moving magnet may be disposed on the sensor rod slider, and a first fixed magnet for holding the sensor rod on the measurement position and a second fixed magnet for holding the sensor rod on the safety position may be disposed on the housing. When the sensor rod is taken in, the moving magnet may be attracted to the second fixed magnet disposed on the safety position to seat the sensor rod on the safety position, and when the sensor rod is taken out, the moving magnet may be attracted to the first fixed magnet disposed on the measurement position to seat the sensor rod on the measurement position, thereby connecting the sensor contact point thereto.

Since the tip of the sensor rod is formed of a platinum-plated copper having a good conductivity property, the temperature sensor together with thermal cream is built in the copper, and a rod body is formed of a stainless steel having low conductivity, thermal equilibrium between the temperature sensor and the measurement object may be quickly reached. An insulator may be inserted between the tip of the sensor rod and the rod body to quickly reach the thermal equilibrium between the temperature sensor and the measurement object.

DETAILED DESCRIPTION OF THE INVENTION

Technical objectives of the present invention will become evident through the following embodiments. The following embodiments are merely illustrative of the present invention, and thus, this should not be construed as limited to the scope of the present invention.

Figure 1:
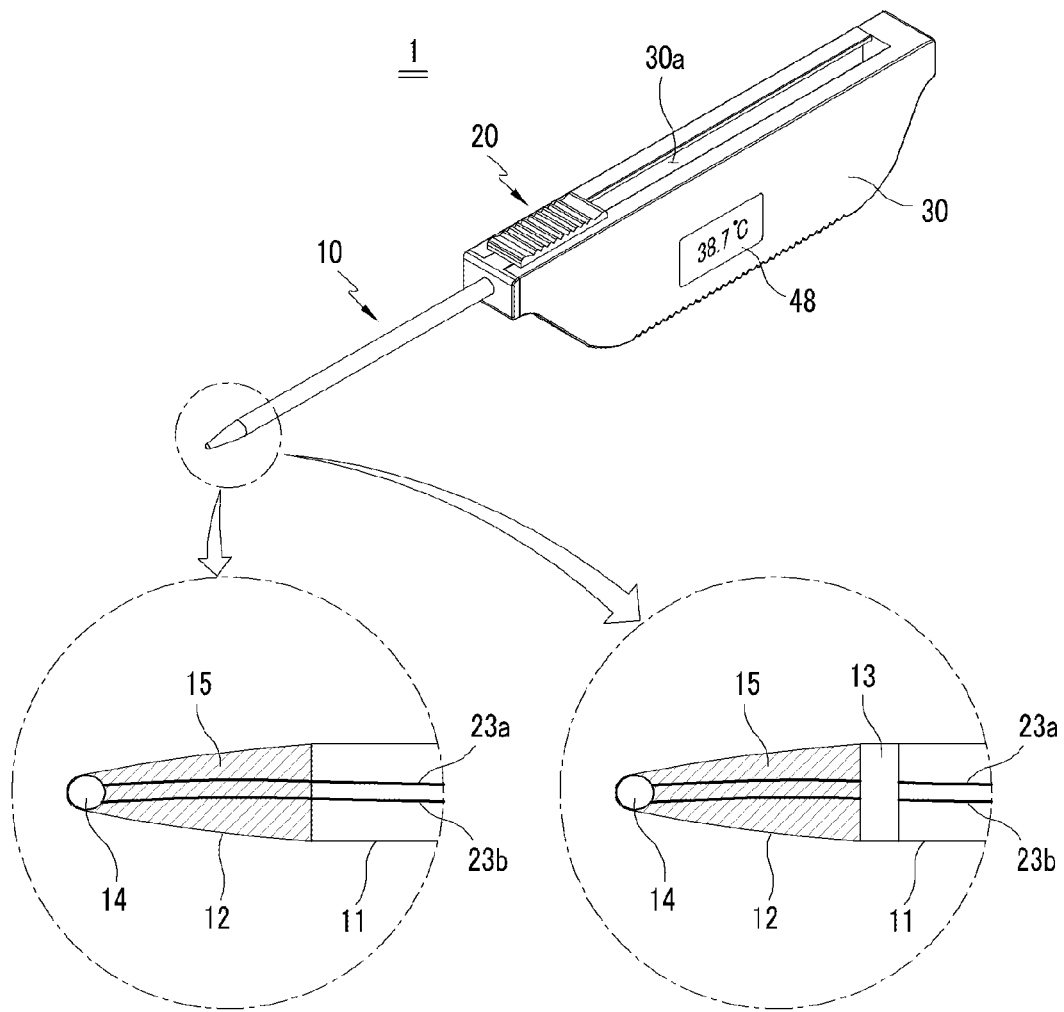
FIG. 1 is a perspective view of a safety thermometer according to the present invention.

FIG. 1 is a perspective view of a safety thermometer according to the present invention.

As shown in FIG. 1, a safety thermometer 1 according to the present invention includes a pin-type sensor rod 10 in which a temperature sensor 14 is disposed on a tip 12 thereof, a sensor rod slider 20 integrally coupled to a side opposite to the tip of the sensor rod 10 to slide the sensor rod 10 and connect a detection signal of the temperature sensor 14 to a circuit, and a housing 30 in which a space for receiving the sensor rod 10 and a slide groove 30a are defined to allow the sensor rod 10 to take it in or out the housing by the sensor rod slider 20. Here, the housing 30 receives a printed circuit board (PCB) (see reference numeral 40 of FIG. 2) for measuring a temperature in a space separated from the space for receiving the sensor rod 10 by a partition wall 31. Also, a liquid crystal display (LCD) 48 for displaying a temperature value is attached to the housing 30.

Referring to FIG. 1, the sensor rod 10 of the safety thermometer 1 according to the present invention has a structure, which prevents heat of the tip 12 from being transmitted toward a rod body 11 because the tip 12 on which a thermistor that is the temperature sensor 14 for quickly measuring the temperature is disposed and the rod body 11 are formed of materials different from each other. That is, according to a related art safety thermometer, since a tip and a rod body are formed of the same material, heat of the tip is transmitted into the rod body. Thus, it takes a long time until a temperature sensor and a measurement object reach thermal equilibrium state. However, according to the sensor rod 10 of the present invention, the tip 12 on which the temperature sensor 14 is disposed is formed of a copper having high conductivity, and the rod body 11 is formed of a stainless steel having low conductivity. Thus, since it prevents heat of the tip 12 from being transmitted into the rod body 11, a temperature of the measurement object may be quickly measured. Here, the tip 12 may be plated with platinum to prevent it from rusting.

Also, a thermal cream 15 for improving the conductivity may be filled within the tip 12 on which the temperature sensor 14 is disposed. In addition, an insulator 13 having an insulating property may be additionally disposed between the tip 12 and the rod body 11. Here, in case where the insulator having the insulating property is added, the temperature of the measurement object may be further quickly measured regardless of the material of the rod body 11.

Figure 2:
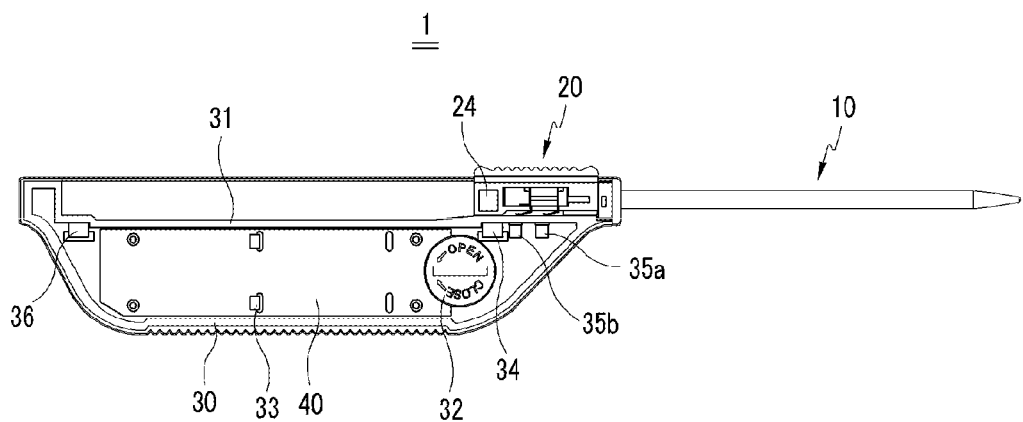
FIG. 2 is a side-sectional view illustrating a state in which the safety thermometer protrudes to measure a temperature according to the present invention.
Figure 3:
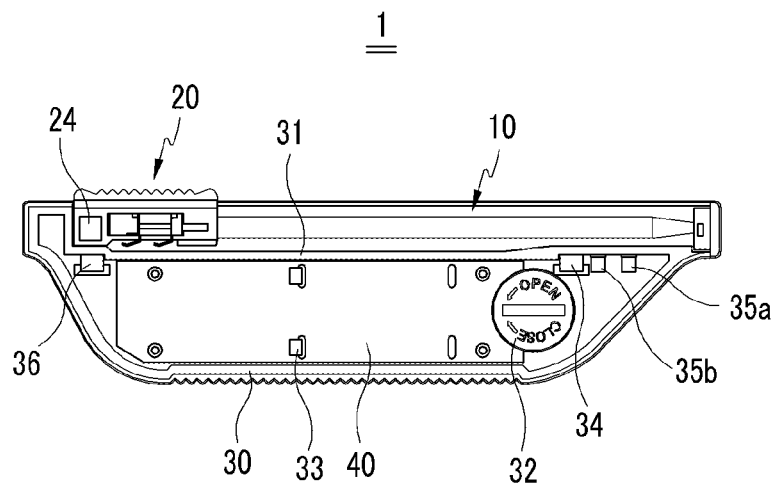
FIG. 3 is a side-sectional view illustrating a state in which a sensor rod of the safety thermometer is inserted into a housing to improve safety according to the present invention.
Figure 4:
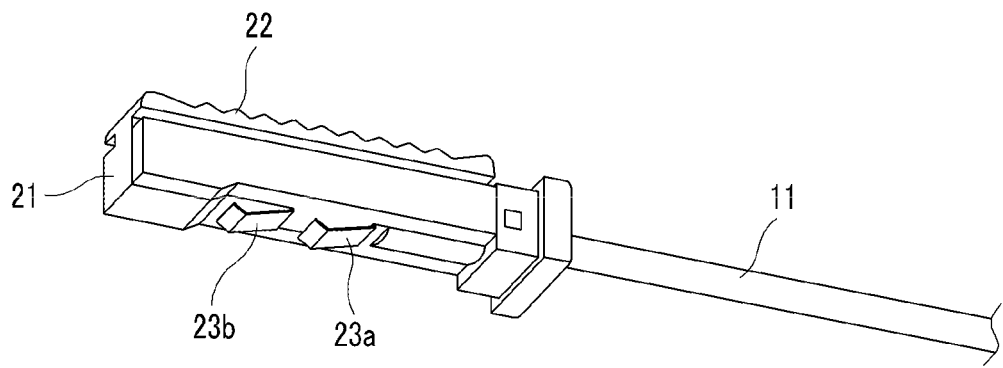
FIG. 4 is a partial perspective view of a sensor rod slider according to the present invention.

FIG. 2 is a side-sectional view illustrating a state in which the safety thermometer protrudes to measure a temperature according to the present invention, FIG. 3 is a side-sectional view illustrating a state in which a sensor rod of the safety thermometer is inserted into a housing to improve safety according to the present invention, and FIG. 4 is a partial perspective view of a sensor rod slider according to the present invention. In an embodiment of the present invention, a measurable position in which the sensor rod 10 protrudes is referred to a 'measurement position' as shown in FIG. 2, and a safety position in which the sensor rod 10 is inserted into the housing 30 is referred to as a 'safety position' as shown in FIG. 3.

As shown in FIGS. 2 and 3, the inside of the housing 30 of the safety thermometer according to the present invention is largely divided into a space in which the sensor rod slider 20 slides by the partition wall 31 and a space in which the PCB 40 is mounted. As described later, circuit devices for processing the temperature detected by the temperature sensor 14 to display the processed temperature on the LCD 48 is mounted on the PCB 40. Also, the PCB 40 is fixed to the housing 30 by a locking knob 33, and a dry battery cap 32 for mounting a dry battery is coupled to a side surface of the PCB 40.

Also, according to the safety thermometer 1 of the present invention, a moving magnet 24 is disposed on a body 21 of the sensor rod slider 20, and a first fixed magnet 34 is disposed on a front side of a slide space of the housing 30. Thus, when the sensor rod 10 protrudes to the outside of the housing 30, the sensor rod 10 is held at the measurement position by an attractive force between the moving magnet 24 of the sensor rod slider 20 and the first fixed magnet 34. Here, when sensor electrodes 23a and 23b of the sensor rod slider 20 contact sensor electrodes 35a and 35b disposed on the housing 30, current flows to detect the temperature of the measurement object using the temperature sensor 14 disposed on the sensor rod 10.

Also, a second fixed magnet 36 for holding the sensor rod 10 on the safety position is disposed on a rear side of the slide space of the housing 30. Thus, when the sensor rod 10 is inserted into the housing 30, the sensor rod 10 is held at the safety position by an attractive force between the second fixed magnet 36 and the moving magnet 24 of the sensor rod slider 20.

Thus, as shown in FIG. 2, when the safety thermometer 1 according to the present invention is used for measuring a temperature, the sensor rod 10 protrudes to attach the moving magnet 24 of the slider to the first fixed magnet 34. Also, the sensor electrodes 23a and 23b contact the sensor electrodes 35a and 35b of the housing 30 to allow the current to flow into the temperature sensor 14, thereby measuring the temperature. As shown in FIG. 3, when a handle 22 of the slider 20 is withdrawn in a rear direction, the moving magnet 24 of the slider 20 is attached to the second fixed magnet 36. Thus, a sharp portion of the sensor rod 10 is hid into the housing 30 to improve moving convenience and safety.

Also, as shown in FIG. 3, when the sensor rod 10 contacts a human body during the use, the moving magnet 24 of the slider is attached to the second fixed magnet 36 to hide the sharp portion of the sensor rod 10 into the housing 10, thereby preventing the human body form being damaged.

Figure 5:
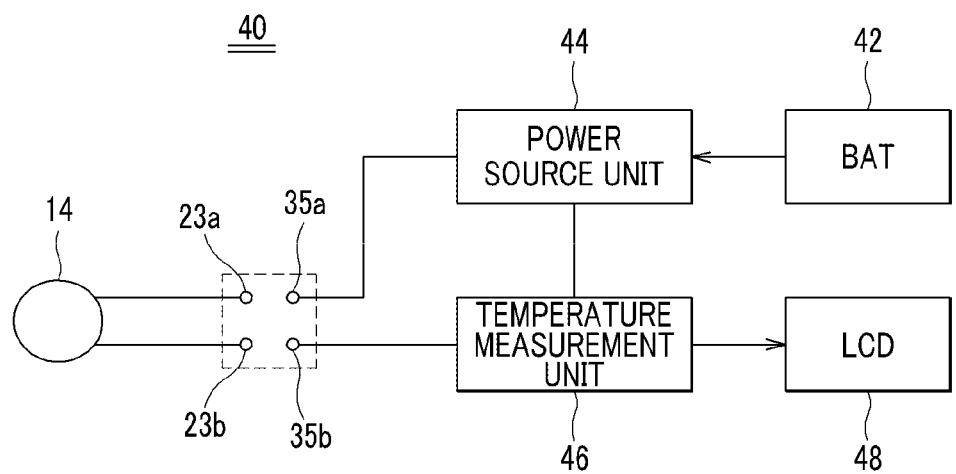
FIG. 5 is a block diagram of the safety thermometer according to the present invention.

FIG. 5 is a block diagram of the safety thermometer according to the present invention. A circuit according to the present invention includes a power source unit 44, a temperature measurement unit 46, and an LCD 48.

Referring to FIG. 5, the power source unit 44 provides a power for measuring a temperature using a power inputted from a battery 42. When the sensor rod 10 is disposed at the measurement position, the sensor electrodes 23a and 23b of the slider 20 and the sensor electrodes 35a and 35b contact each other to flow into the temperature sensor 14. Then, the temperature measurement unit 46 calculates the detected value of the temperature sensor 14 to display the measured temperature on the LCD 48.

Here, according to the safety thermometer 1 of the present invention, since the tip 12 of the sensor rod 10 and the body 11 of the rod body 11 are formed of materials different from each other, the heat of the measurement object may be quickly transmitted into the temperature sensor 14 through the thermal cream 15, but the tip 12 may be insulated from the rod body 11. Thus, the temperature sensor 14 and the measurement object may quickly reach the thermal equilibrium to quickly measure the temperature of the measurement object.

Although the safety thermometer 1 of the present invention is used only for temperature measurement in the present embodiment, the present invention is not limited thereto. For example, the safety thermometer 1 may be used for salt meters, hygrometers, measure instruments, etc, in which temperature measurement is required, as it is.

According to the safety thermometer of the present invention, when the sensor rod for measuring a temperature is taken in the housing, the power may be automatically turned on to measure the temperature. Here, when the sensor rod contacts the human body, the sensor rod may be easily taken in the housing by the magnet to protect persons, thereby improving the use-safety in a home. In addition, when the sensor rod for measuring the temperature is not used, the sensor rod may be taken in the housing to improve the movement and storage of the safety thermometer. Also, since the sensing portion of the sensor rod may be insulated from other portions to prevent the heat from being dispersed, the temperature of the measurement object may be quickly and accurately measured.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A safety thermometer comprising:
a pin-type sensor rod on which a temperature sensor for measuring a temperature is disposed on a tip thereof;
a sensor rod slider integrally coupled to a side opposite to the tip of the sensor rod to slide the sensor rod between a measurement position and a safety position, the sensor rod slider having a sensor contact point for connecting a sensor signal of the sensor rod to a circuit;
a housing in which a space for receiving the sensor rod and a slide groove are defined to take the sensor in or out by the sensor rod slider, the housing having a space separated from the space for receiving the sensor rod by a partition wall to receive circuit devices;
a temperature measurement unit turned on by receiving a power from a power source unit when it contacts the sensor contact point of the sensor rod slider, the temperature measurement unit being connected to the temperature sensor of the sensor rod through the sensor rod slider to process and output a value detected by the temperature sensor; and
a display unit displaying the value measured by the temperature measurement unit,
wherein, when the sensor rod for measuring the temperature is taken out the housing, the power is automatically turned on, and when the sensor rod contacts a human body, the sensor rod is easily taken in the housing to protect the human body,
wherein a moving magnet is disposed on the sensor rod slider, and a first fixed magnet for holding the sensor rod on the measurement position and a second fixed magnet for holding the sensor rod on the safety position are disposed on the housing,
wherein, when the sensor rod is taken in, the moving magnet is attracted to the second fixed magnet disposed on the safety position to seat the sensor rod on the safety position, and when the sensor rod is taken out, the moving magnet is attracted to the first fixed magnet disposed on the measurement position to seat the sensor rod on the measurement position, thereby connecting the sensor contact point thereto.

2. The safety thermometer of claim 1, wherein, since the tip of the sensor rod is formed of a platinum-plated copper having a good conductivity property, the temperature sensor together with thermal cream is built in the copper, and a rod body of the sensor rod is formed of a stainless steel having low conductivity, thermal equilibrium between the temperature sensor and a measurement object is quickly reached.

3. The safety thermometer of claim 1, wherein the housing has one surface in which a hole for receiving the display unit is defined and another surface on which a dry battery cap is disposed.

4. A safety thermometer comprising:
a pin-type sensor rod on which a temperature sensor for measuring a temperature is disposed on a tip thereof;
a sensor rod slider integrally coupled to a side opposite to the tip of the sensor rod to slide the sensor rod between a measurement position and a safety position, the sensor rod slider having a sensor contact point for connecting a sensor signal of the sensor rod to a circuit;
a housing in which a space for receiving the sensor rod and a slide groove are defined to take the sensor in or out by the sensor rod slider, the housing having a space separated from the space for receiving the sensor rod by a partition wall to receive circuit devices;
a temperature measurement unit turned on by receiving a power from a power source unit when it contacts the sensor contact point of the sensor rod slider, the temperature measurement unit being connected to the temperature sensor of the sensor rod through the sensor rod slider to process and output a value detected by the temperature sensor; and
a display unit displaying the value measured by the temperature measurement unit,
wherein, when the sensor rod for measuring the temperature is taken out the housing, the power is automatically turned on, and when the sensor rod contacts a human body, the sensor rod is easily taken in the housing to protect the human body,
wherein, since the tip of the sensor rod is formed of a platinum-plated copper having a good conductivity property, the temperature sensor together with thermal cream is built in the copper, and a rod body of the sensor rod is formed of a stainless steel having low conductivity, thermal equilibrium between the temperature sensor and a measurement object is quickly reached,
wherein an insulator is inserted between the tip of the sensor rod and the rod body to quickly reach the thermal equilibrium between the temperature sensor and the measurement object.

5. The safety thermometer of claim 4, wherein a moving magnet is disposed on the sensor rod slider, and a first fixed magnet for holding the sensor rod on the measurement position and a second fixed magnet for holding the sensor rod on the safety position are disposed on the housing,
wherein, when the sensor rod is taken in, the moving magnet is attracted to the second fixed magnet disposed on the safety position to seat the sensor rod on the safety position, and when the sensor rod is taken out, the moving magnet is attracted to the first fixed magnet disposed on the measurement position to seat the sensor rod on the measurement position, thereby connecting the sensor contact point thereto.

6. The safety thermometer of claim 4, wherein the housing has one surface in which a hole for receiving the display unit is defined and another surface on which a dry battery cap is disposed.

* * * * *